US005233277A

United States Patent [19]

Kasig et al.

[11] Patent Number: 5,233,277

[45] Date of Patent: Aug. 3, 1993

[54] APPARATUS FOR CONTROLLING THE OPERATION OF ELECTRIC MOTORS IN SEWING MACHINES

[75] Inventors: Rüdiger Kasig, Reichenau, Fed. Rep. of Germany; Peter Weber, Kreuzlingen, Switzerland

[73] Assignee: Fritz Gegauf Aktiengesellschaft Bernina Nähmaschinenfabrik, Steckborn, Switzerland

[21] Appl. No.: 845,561

[22] Filed: Mar. 4, 1992

[30] Foreign Application Priority Data

Mar. 14, 1991 [CH] Switzerland ....................... 00774/91

[51] Int. Cl.[5] ........................ H02P 7/00; D05B 69/18

[52] U.S. Cl. .................................... 318/551; 388/933; 112/277; 318/480

[58] Field of Search ................ 318/551, 480; 388/268, 388/933; 112/271, 274, 275, 277

[56] References Cited

U.S. PATENT DOCUMENTS 1,582,702 4/1926 Stoekle et al. .
3,145,304 8/1964 Bostrom et al. .
3,738,297 6/1973 Sangiorgi .
4,310,788 1/1982 Hanyu ................................ 318/551
4,386,301 5/1983 Neki et al. .
4,399,393 8/1983 Santini ........................... 318/551 X
4,459,523 7/1984 Evans et al. ....................... 318/480

*Primary Examiner*—Bentsu Ro
*Attorney, Agent, or Firm*—Peter K. Kontler

[57] ABSTRACT

The electric motor and the needle locating device of a sewing machine are adjusted by a pivotable treadle controlling a radiation directing member which is located in the path of radiation issuing from one end of one or more first optical fibers the other end or ends of which receive radiation from a suitable source, and the member controls the amount of radiation entering the adjacent end or ends of one or more second optical fibers which convey the radiation to an optical detector. The latter selects the speed of the motor in dependency on the amount of radiation which is transmitted into the second optical fiber or fibers and selects the position of the needle when the motor is off. The radiation directing member can constitute a glass plate which is rotatable or performs translatory movements between the first and second optical fibers and includes portions of different radiation transmissivity or reflectivity.

20 Claims, 3 Drawing Sheets

APPARATUS FOR CONTROLLING THE OPERATION OF ELECTRIC MOTORS IN SEWING MACHINES

BACKGROUND OF THE INVENTION

The invention relates to sewing machines in general, and more particularly to improvements in apparatus for controlling the operation of certain components in sewing machines, especially the operation of a variable speed motor.

In many instances, the speed of a variable-speed motor, particularly an electric motor, in a sewing machine is controlled by a foot-operated device which includes a pedal or treadle. This enables the operator of the sewing machine to select the number of stitches per unit of time. As a rule, the foot-operated device comprises a switch, a series of switches, a variable resistor or a like part which must be connected to electric conductors. Reference may be had, for example, to Swiss Pat. No. 659,054 wherein a pedal must be pivoted in a first direction in order to actuate a variable resistor which initiates the operation of the electric motor at a progressively increasing speed. If the pedal is pivoted in a second direction counter to the first direction, it completes the circuit of a device which causes the needle of the sewing machine to assume its upper or lower end position when the motor is brought to a halt. A drawback of the apparatus which is disclosed in the Swiss patent is that electric current must flow through the foot-operated device which contributes to the cost, particularly for proper insulation, brings about the danger of electric shock to the operator of the sewing machine, and renders it necessary to suppress potential interference.

U.S. Pat. No. 4,310,788 to Hanyu et al. discloses a speed control device for sewing machines wherein a triangular light beam interrupting member is movable in a foot-operated device to control the extent of penetration of light from a first set of optical fibers into a second set of optical fibers. The amount of light which penetrates into the second set of optical fibers determines the speed of the electric motor of the sewing machine. A drawback of the patented proposal is that the speed of the motor cannot be regulated with a requisite degree of accuracy. More specifically, it is difficult to ensure gradual (rather than jerky stepwise) variation of the speed of the motor and hence the number of stitches per unit of time. Furthermore, it is normally necessary to utilize a rather large number of optical fibers, the light interrupting member must be finished with a high degree of precision, and the means for moving the light interrupting member must be assembled with a very high degree of accuracy. This cannot be readily achieved in view of the normally large manufacturing tolerances for light emitting and light receiving components of presently known and available optical detectors. Moreover, the patented apparatus is designed to control only the speed of the electric motor in the sewing machine.

OBJECTS OF THE INVENTION

An object of the invention is to provide an apparatus which can control the speed of the motor and/or at least one other component of a sewing machine with a high degree of accuracy and predictability.

Another object of the invention is to provide an apparatus which is safe, simple and inexpensive, which can be installed in existing sewing machines, and which does not consume any electrical or other energy.

A further object of the invention is to provide a novel and improved method of regulating the speed of an electric motor in a sewing machine and the position of the needle when the motor is off.

An additional object of the invention is to provide novel and improved remote controls for the speed of the motor in a sewing machine.

Still another object of the invention is to provide an apparatus which can control the speed of the motor in a sewing machine in accordance with a selected pattern, such as linearly or progressively.

A further object of the invention is to provide a sewing machine which is combined with or embodies the above outlined apparatus.

SUMMARY OF THE INVENTION

The invention is embodied in an apparatus for controlling the operation of at least one component of a sewing machine. The improved apparatus comprises at least one optical detector (such optical detector can include a photoelectric cell), at least one radiation guide (such as an optical fiber or light guide) comprising a first section having a radiation receiving first end and a second end and a second section having a radiation transmitting first end connected to the detector and a second end, the two second ends being disposed outside of the sewing machine, means (such as a source of polarized light or a source of frequency modulated radiation) for supplying radiation to the first end of the first section of the radiation guide so that the thus supplied radiation issues from the second end of the first section, means for directing radiation which issues from the second end of the first section into the second end of the second section wherein the radiation is propagated to the detector, and means for moving the directing means between a plurality of different positions in each of which the second section receives a different amount of radiation.

The moving means can comprise a treadle and the directing means can be mounted in such a way that it is turnable between its different positions. Alternatively, the moving means can be designed to confine the directing means to translatory (i.e., nonrotary) movements between its positions.

The arrangement is or can be such that the entire radiation issuing from the first section of the radiation guide impinges upon the directing means in each position of the latter.

The apparatus can comprise a common enclosure (e.g., a metallic or plastic housing) for the second ends of the sections of the radiation guide, and the moving means is preferably carried by the enclosure.

If the at least one component of the sewing machine includes a variable-speed motor, such as an electric motor, the detector can include means (e.g., a signal processing circuit) for operating the motor at a plurality of different speeds in response to reception of different amounts of radiation from the second section of the radiation guide. In addition to or in lieu of the motor, the at least one component can include a device which is operable to maintain a mobile needle of the sewing machine in a selected position, and the detector then includes means for operating such device in response to reception of a predetermined amount of radiation (e.g., zero amount) from the second section of the radiation guide.

The directing means can include portions of different reflectivity for radiation which issues from the first section of the radiation guide. Alternatively, the directing means can include a spectral filter or the directing means can comprise a filter (e.g., a glass plate) having portions of different radiation transmissivity or reflectivity. For example, a filter can include at least one first portion which transmits a maximum amount of radiation and a series of second portions which transmit radiation at a linearly or progressively decreasing rate. Such filter can further include at least one additional portion which transmits a minimal amount (e.g., zero amount) of radiation. Such at least one additional portion can be adjacent the first portion. The additional portion can be composed of a plurality of alternating portions of maximum and minimum radiation transmissivity.

The detector and the radiation supplying means can be installed in the sewing machine.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
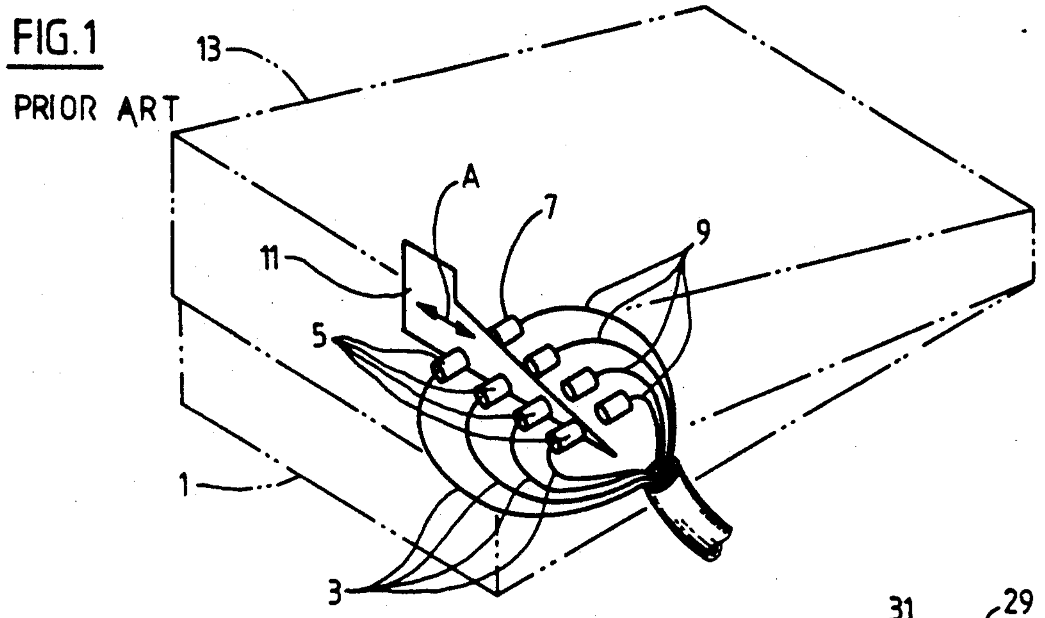
FIG. 1 PRIOR ART
FIG. 1 is a perspective view of a conventional apparatus.

Referring first to FIG. 1, there is shown a portion of an apparatus which is described and shown in U.S. Pat. No. 4,310,788 to Hanyu et al. The illustrated portion of the patented apparatus is located outside of a sewing machine and serves to regulate the speed of the electric motor in such machine. A housing 1 carries a pivotable pedal 13 which can be manipulated by a leg of the operator of the sewing machine. Several first optical fibers 3 receive light from an electric lamp which is in circuit with the variable-speed electric motor of the sewing machine, and such fibers have light emitting ends 5 in the housing 1. Several second optical fibers 9 serve to transmit light to a set of photoconductive elements in the circuit of the electric motor, and a triangular light interrupting plate 11 is movable in directions indicated by a double-headed arrow A in response to pivoting of the pedal 13 relative to the housing 1. When the pedal 13 is not depressed by a foot, it maintains the plate 11 in a position such that the plate fully intercepts all light beams issuing from the ends 5 of the optical fibers 3 so that the ends 7 of optical fibers 9 receive no light and the resistance of the photoconductive elements to the flow of electric current reaches a maximum value. As the pedal 13 is depressed, it causes the plate 11 to change its position relative to the ends 5 of the optical fibers 3 so that the ends 7 of the fibers 9 receive increasing amounts of light and the resistance of the photoconductive elements to the flow of electric current decreases. The pedal 13 is pivotable by the foot of an operator in a counterclockwise direction, and it is assumed that the housing 1 contains a spring which urges the pedal 13 to that end position in which the photoconductive elements offer maximum resistance to the flow of an electric current. A drawback of the just described apparatus is that the speed of the motor, and hence the number of stitches per unit of time, cannot be selected with a high degree of accuracy even if the apparatus employs a very large number of optical fibers. Furthermore, the photoconductive elements which receive light from the optical fibers 9 control only the electric motor of the sewing machine. In addition, it is difficult to accurately control the position of the plate 11 so that the speed of the motor can be varied only in stepwise fashion.

Figure 12:
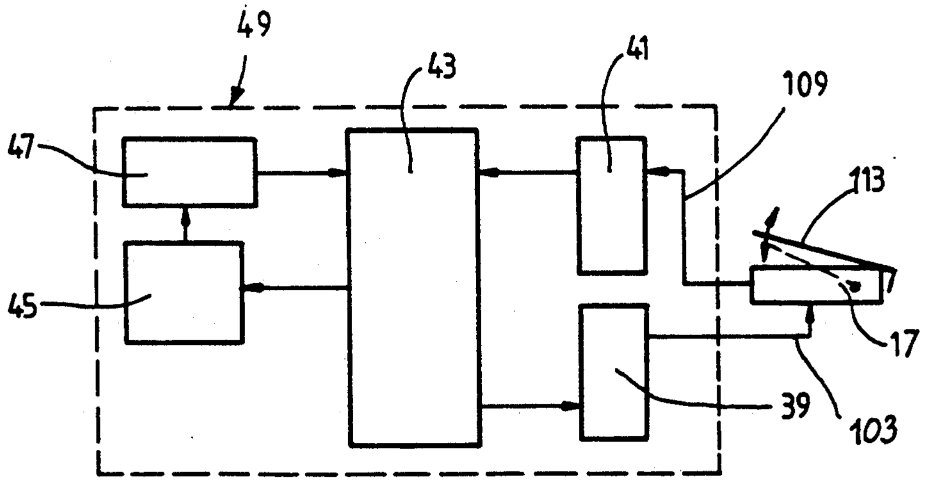
FIG. 12 is a block diagram of the improved apparatus and of certain other parts of a sewing machine.

FIG. 12 shows schematically a sewing machine 49 which comprises a variable-speed electric motor 45 of any known design, another component 47 which serves as a device for maintaining a mobile needle (not specifically shown) of the sewing machine 49 in a selected position (normally the upper or the lower end position) when the motor 45 is idle, a light emitting diode 39 or other suitable means for supplying radiation to the adjacent end or ends of the first section or sections 103 of one or more radiation guides (such as optical fibers), and an optical detector including a photoelectric cell 41 which receives radiation (at least at certain times) from the first end or ends of one or more second sections 109 of the radiation guide or guides. The detector further includes a signal processing circuit 43 which receives signals from the cell 41 and transmits signals to the motor 45 and/or to the device 47. The arrangement in the sewing machine 49 of FIG. 12 is such that the circuit 43 can transmit signals to the motor 45 (such signals serve to start or arrest the motor or to ensure that the motor is driven at a selected speed corresponding to a selected number of stitches per unit of time), that the motor 45 can transmit signals to the device 47 (for example, to ensure that the needle is moved to the upper or lower end position when the motor 45 is idle), and that the device 47 transmits signals to the circuit 43 in order to indicate its position and hence the position of the needle.

The apparatus of the present invention includes the radiation supplying means 39 (such radiation supplying means can be designed to constitute a source of polarized light or a source of high frequency modulated radiation), the detector 41, 43, an enclosure 17 (e.g., a sturdy metallic or plastic housing) which is installed outside of the machine 49, radiation directing means in the form of a plate-like filter 31 (FIGS. 2 to 6) which can be made of glass, and means (including a treadle 113 which is pivotably carried by the enclosure 17) for moving the filter 31 between a plurality of different positions in each of which the section or sections 109 of the radiation guide receive different amounts of radiation issuing from the section or sections 103. FIG. 6 shows a single first section 103 having an end 105 in the enclosure 17 and a single second section 109 having an end 107 in the enclosure 17. The filter 31 is movable between the ends 105, 107 of the sections 103, 109, i.e., in the enclosure 17, and is operatively connected with the treadle 113 so that it performs translatory movements in response to pivoting of the treadle between a first end position (shown in FIG. 3) and a second end position (shown in FIG. 4).

The enclosure 17 has legs 17*e* which contact the floor adjacent the sewing machine 49 so that the treadle 113 is accessible to at least one foot of the person operating the sewing machine. This treadle 113 is pivotable about a horizontal axis which is defined by a shaft 15 installed in the upstanding lateral sidewalls 17*a* of the enclosure 17. To this end, the underside of the treadle 113 is rigid with one or more arms 113*a* which are mounted on the shaft 15. The means for biasing the treadle 113 to the intermediate position of FIG. 2 comprises a lever 21 which is pivotable on the shaft 15 and is urged against a stop 23 at the underside of the treadle by a coil spring 27. The latter also urges the lever 21 against an internal stop 25 of the enclosure 17 and cooperates with a torsion spring 19 which tends to pivot the treadle 113 in a clockwise direction. When the lever 21 abuts the stops 23 and 25, the treadle 113 is ready to be pivoted in a clockwise direction through a distance v or in a counterclockwise direction through a distance z. Pivoting of the treadle 113 in a clockwise direction causes the detector 41, 43 to vary the speed of the motor 45, and pivoting of the treadle in a counterclockwise direction causes the detector to operate the device 47 (e.g., by way of the motor 45) so that the needle is moved to the upper or lower end position.

Figure 2:
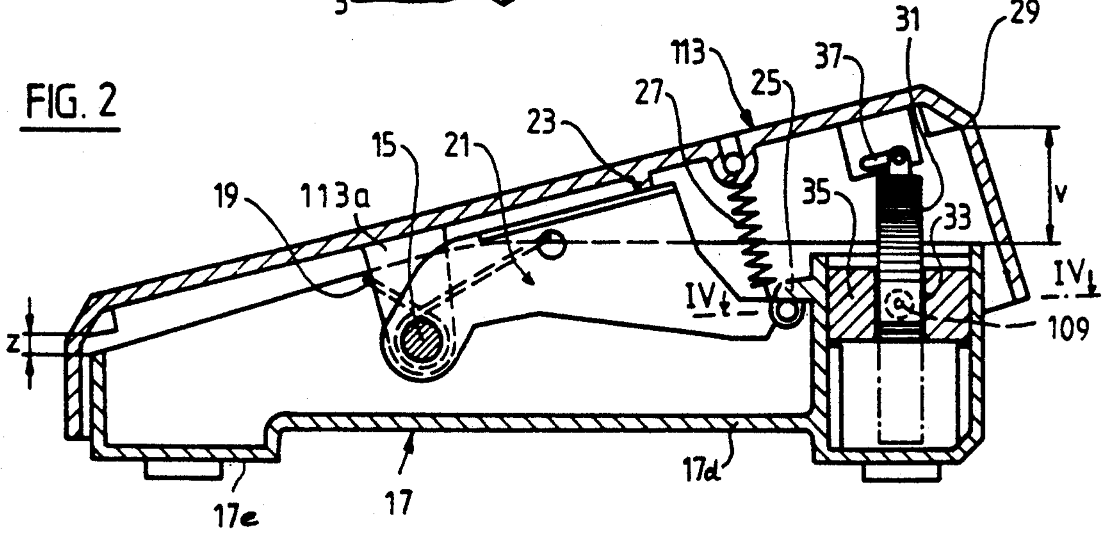
FIG. 2 is a central sectional view of a portion of an apparatus which embodies one form of the invention.
Figure 3:
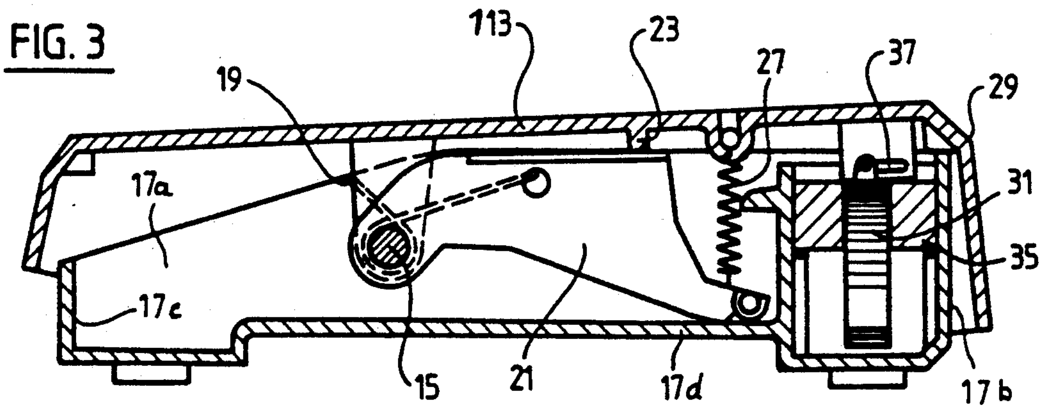
FIG. 3 shows the structure of FIG. 2 but with the treadle and radiation directing means in a different position.
Figure 4:
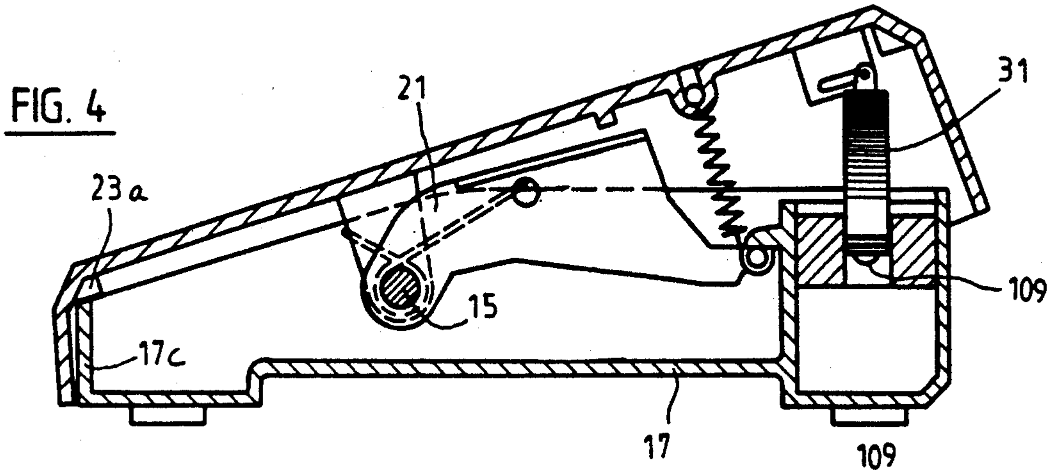
FIG. 4 shows the structure of FIGS. 2 and 3 but with the treadle and the radiation directing means in a further position.

The filter 31 is articulately coupled to the treadle 113 at 37 so that it moves downwardly from the neutral position of FIG. 2 in response to clockwise pivoting of the treadle, and that it moves upwardly from the neutral position of FIG. 2 in response to counterclockwise pivoting of the treadle. FIG. 3 shows the treadle 113 in that end position in which the distance v is zero, and FIG. 4 shows the treadle 113 in the other end position in which the distance z is zero.

The shaft 15 is or can be located substantially midway between the front and rear sidewalls 17*b*, 17*c* of the enclosure 17 in contrast with the mounting of the pedal 13 on the housing 1 of the conventional apparatus of FIG. 1. When the treadle 113 is pivoted to the end position of FIG. 3, the lever 21 abuts the bottom wall 17*d* of the enclosure 17. If the treadle 113 is pivoted from the neutral position of FIG. 2 to the end position of FIG. 4, the spring 27 stores additional energy because the lever 21 is spaced apart from the stop 23, and a further stop 23*a* at the underside of the treadle then abuts the rear sidewall 17*c* of the enclosure 17. The purpose of the stops (including those shown at 23, 23*a*, the rear sidewall 17*c* and the bottom wall 17*d*) for the treadle 113 is to prevent damage to the filter 31. The purpose of the torsion spring 19 is to bias the treadle 113 to the neutral position of FIG. 2 in which the motor 45 is idle. The spring 19 is free to move the treadle 113 to the neutral position of FIG. 2 as soon as the operator removes her or his foot from the upper side of the treadle or as soon as the pressure which is exerted by the foot upon the treadle is less than the bias of the spring 19.

The coupling 37 for the upper portion of the filter 31 is adjacent the front end 29 of the treadle 113. This filter is located between the ends 105, 107 of the sections 103, 109 of the radiation guide, and more specifically in a slot 33 which is provided in a holder 35 for the ends 105, 107 in the interior of the enclosure 17 adjacent the front sidewall 17*b*. The end 105 is embedded in the holder 35 at one side of the slot 33, and the end 107 is embedded in the holder 35 at the other side of the slot 33 opposite the end 105. A portion of the filter 31 is or can be located between the ends 105, 107 of the respective sections 103, 109 of the radiation guide in each angular position of the treadle 113.

The illustrated straight elongated filter 31 can be replaced with an arcuate filter (not shown) which is rigidly coupled to the underside of the treadle 113 and is caused to perform translatory movements in an arcuate slot of the holder 35 or of an equivalent holder for the ends 105, 107 of the sections 103, 109.

Figure 10:
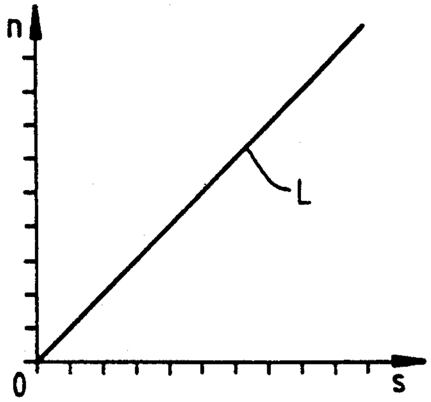
FIG. 10 is a diagram showing one mode of directing radiation to the second section of the radiation guide in the improved apparatus.
Figure 11:
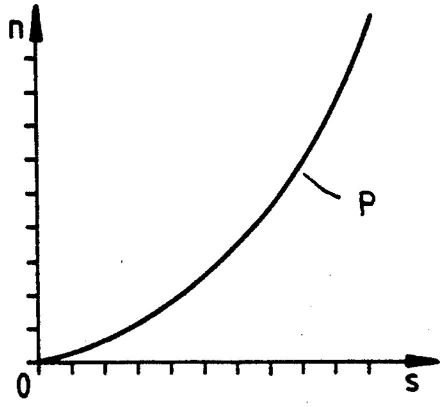
FIG. 11 is a diagram showing another mode of directing radiation to the second section of the radiation guide in the improved apparatus.

The filter 31 of FIGS. 2 to 6 comprises a first portion T (FIG. 5) which does not intercept any radiation or intercepts a minimal amount of radiation, i.e., all or nearly all radiation issuing from the end 105 of the section 103 can penetrate through the filter portion T and into the adjacent end 107 of the section 109. This is the case in the neutral position (FIG. 2) of the treadle 113 and filter 31. The latter further comprises a zone S of progressively decreasing radiation transmissivity so that, when the treadle 113 is pivoted from the neutral position of FIG. 2 toward the end position of FIG. 3, the filter 31 is caused to move through a series of successive positions in each of which the end 107 of the section 109 receives a lesser amount of radiation which issues from the end 105 of the section 103. The transmissivity of the zone S is maximal immediately adjacent the portion T and is minimal (e.g., zero) at a maximum distance from the portion T. When the radiation issuing from the end 105 of the section 103 penetrates through the section S of the filter 31, the motor 45 is on and the speed of this motor is a function of the momentary position of the filter 31, i.e., a function of the distance of the portion T from the ends 105, 107. The transmissivity of the section S can be selected in such a way that the speed of the motor 45 increases or decreases linearly (note the line or curve L in FIG. 10) or progressively (note the curve P in FIG. 11). In the diagrams of FIGS. 10 and 11, the speed n of the motor 45 is measured along the ordinate and the extent s of movement of the filter 31 from the neutral position of FIG. 2 toward the end position of FIG. 3 is measured along the abscissa.

The portion T of the filter 31 is located between the zone S and a zone C which is immediately adjacent the portion T and includes alternating portions of maximum and minimum transmissivity. The width of the portions of maximum transmissivity (white) can but need not match the width of portions (black) of minimum transmissivity. At any rate, the transition from transmissivity in the portion T to transmissivity in the immediately adjacent portion of the zone C is preferably abrupt, in contrast to the very gradual or substantially gradual transition between the transmissivity of the portion T and the transmissivity of the immediately adjacent portion of the zone S.

The operation of the apparatus which includes the structure of FIGS. 2 to 6 and is used in conjunction with the sewing machine 49 of FIG. 12 is preferably such that the detector 41, 43 disconnects the motor 45 from the energy source when the treadle 113 assumes the neutral position of FIG. 2 so that radiation issuing from the end 105 of the section 103 can penetrate, without any obstruction or with a minimum of obstruction, into the end 107 of the section 109, i.e., into the photoelectric cell 41 of the detector.

If the treadle 113 is thereupon pivoted clockwise away from the neutral position of FIG. 2, the rate of penetration of radiation which issues from the end 105 into the end 107 is reduced in response to increasing distance of the lever portion 21*a* from the stop 25. This induces the cell 41 to transmit to the circuit 43 signals which are processed to ensure that the motor 45 is driven at a progressively higher speed, and such speed assumes a maximum value when the treadle 113 reaches the end position of FIG. 3. The speed of the motor 45 can be reduced by the operator if the spring 19 is permitted to pivot the treadle 113 back toward the neutral position of FIG. 2.

If the operator decides to pivot the treadle 113 from the neutral position of FIG. 2 in a counterclockwise direction, the first opaque portion of the zone C abruptly changes the rate of penetration of radiation from the end 105 of the section 103 into the end 107 of the section 109. The cell 41 then transmits to the circuit 43 a signal which is processed and is used to operate the device 47 in a sense to move the needle in the sewing machine 49 to the desired position, such as the upper or the lower end position or any other desired position, e.g., directly opposite the momentary position of the needle. The exact details of the device 47 (e.g., an electronically operated servomotor or the like) form no part of the present invention. All that counts is to ensure that the movement of the filter 31 to a position in which the zone C is located between the ends 105, 107 of the sections 103, 109 results in a displacement of the needle to a selected position.

Figure 5:
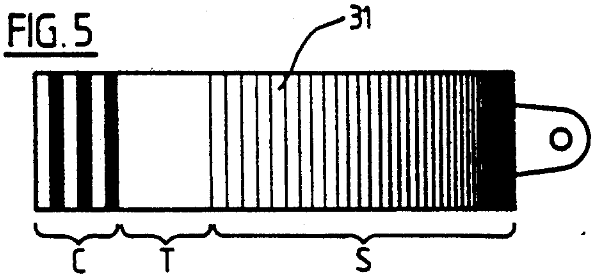
FIG. 5 is an enlarged elevational view of the radiation directing means in the structure of FIGS. 2, 3 and 4.
Figure 6:
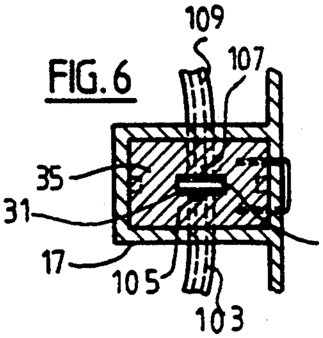
FIG. 6 is a horizontal sectional view substantially as seen in the direction of arrows from the line VI—VI in FIG. 2.

The filter 31 of FIG. 5 can be modified in a number of ways without departing from the spirit of the invention, the same as the detector including the cell 41 and the signal processing circuit 43. For example, the circuit 43 can be modified in such a manner that it drives the motor 45 at a maximum speed when the transmissivity of the filter portion between the sections 103, 109 in the enclosure 17 reaches a maximum value, and the motor is driven at a minimal speed when the transmissivity of the filter portion between the ends 105, 107 is minimal (e.g., zero). Furthermore, the portion T can constitute a portion of minimum transmissivity, and such transmissivity can increase in the zone S proportionally or otherwise in dependency on the extent of movement of the treadle 113 from the neutral position of FIG. 2 toward the end position of FIG. 3.

Figure 7:
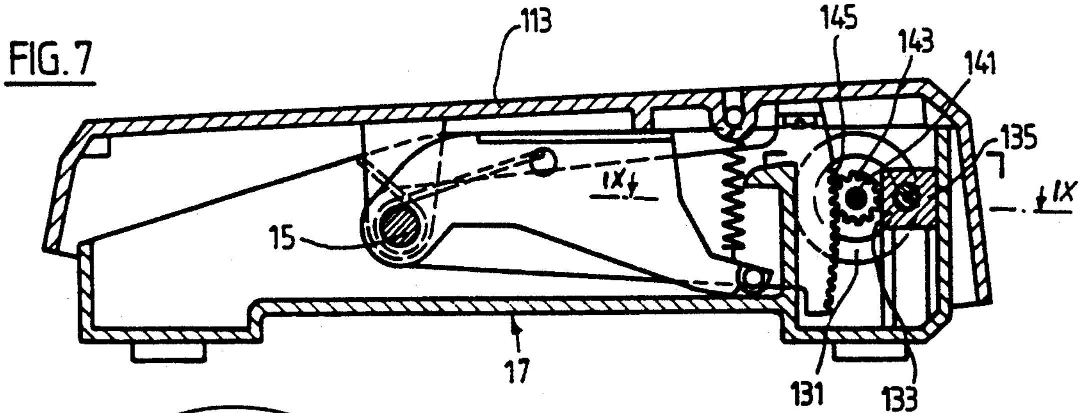
FIG. 7 is a central sectional view of a portion of an apparatus which embodies another form of the invention, the treadle and the radiation directing means being shown in positions corresponding to those of the treadle and radiation directing means in FIG. 3.
Figure 8:
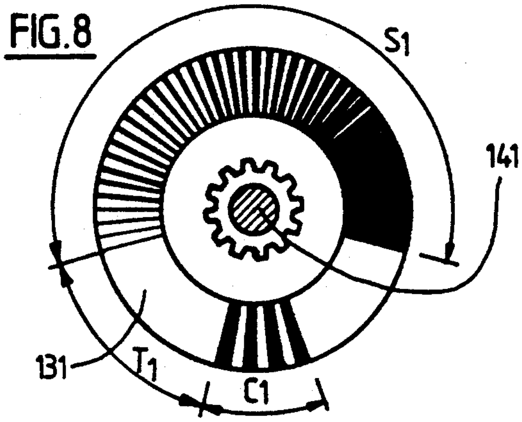
FIG. 8 is an elevational view of the radiation directing means in the apparatus embodying the structure of FIG. 7.
Figure 9:
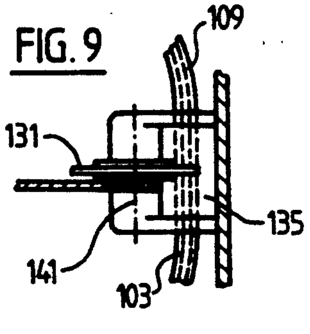
FIG. 9 is a sectional view substantially as seen in the direction of arrows from the line IX—IX in FIG. 7.

FIGS. 7 to 9 illustrate a portion of a modified apparatus wherein the means for moving a circular plate-like filter 131 includes the treadle 113 and a ratchet and pinion drive which is designed to rotate the filter 131 about a fixed horizontal axis defined by a shaft 141 which is parallel to the shaft 15 for the lever 121. The treadle 113 comprises an elongated arcuate toothed rack 145 meshing with a pinion 143 affixed to the shaft 141 which rotates the filter 131. The holder 135 in the enclosure 17 has a slot 133 for a portion of the filter 131. The latter includes an annulus of portions or zones exhibiting different transmissivities to radiation which issues from the adjacent end of the section 103 and tends to propagate itself into the adjacent end of the section 109. The portion T1 of the filter 131 corresponds to the portion T of the filter 31, the zone S1 corresponds to the zone S, and the zone C1 corresponds to the zone C.

The operation of the apparatus which includes the structure of FIGS. 7 to 9 is analogous to that of the apparatus which embodies the structure of FIGS. 2 to 6. The only difference is that the filter 131 is a circular plate, that the portions and zones C1, T1, S1 from an annulus and that the means for moving the filter 131 relative to the holder 135 and the ends of the sections 103, 109 is designed to turn or rotate the filter 131 about a fixed axis (of the shaft 141).

The zones or portions T, S, C and/or T1, S1, C1 of selected transmissivity can be applied to the respective filters 31, 131 by providing the corresponding parts of the external surface of each of these filters with layers of appropriate transmissivity to radiation which is supplied by the source 39.

It is equally within the purview of the invention to replace the glass filter 31 or 131 with other suitable radiation directing means, e.g., with an optical element which has portions capable of reflecting radiation from the end 105 of the section 103 into the end 107 of the section 109 at different rates. Alternatively, the radiation directing means can comprise an optical element having portions which intercept different colors of the spectrum. The detector means including the parts 41, 43 or their equivalents is then designed accordingly so that it can drive the motor 45 at different speeds in different positions of such radiation directing means.

It is further possible to install behind the filter 31 or 131 a mirror (not shown) which reflects the radiation passing through the filter into the section 109 and thus into the sewing machine proper so that the reflected radiation can influence the detector means accordingly. In other words, the end 107 of the section 109 need not be aligned with and need not be adjacent the end 105 of the section 103. Alternatively, one side of the filter 31 or 131 can be mirrored in such a way that the filter reflects different amounts of radiation in different positions of the treadle 113. Such modifications of the radiation directing means merely necessitate appropriate selection of suitable detector means which can control the operation of the device 47 and/or the operation of the motor 45 in a desired manner.

The radiation source 39 is or can be designed to emit high frequency modulated polarized radiation. This reduces the likelihood of undue influencing of the photoelectric cell 41 (or an equivalent thereof) by stray radiation, e.g., by light in the surrounding area.

An important advantage of the improved apparatus is that the speed of the motor of the sewing machine can be regulated with a higher degree of accuracy than in accordance with heretofore known proposals. Moreover, the accuracy of regulation of the speed of the motor is not dependent on the number of optical fibers or other radiation guides.

At the same time, the improved apparatus exhibits all advantages of heretofore known apparatus, i.e., the enclosure 17 need not contain any electrical conductors and the detector means 41, 43 can control the motor 45 as well as the device 47 which determines the position of the needle when the motor is idle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for controlling the operation of at least one component of a sewing machine, comprising at least one optical detector; at least one radiation guide comprising a first section having a radiation receiving first end and a second end and a second section having a radiation transmitting first end connected with said detector and a second end, said second ends being disposed outside of the sewing machine; means for supplying radiation to the first end of said first section so that the thus supplied radiation issues from the second end of said first section; means for directing radiation which issues from the second end of said first section into the second end of said second section wherein the radiation is propagated to said detector, said directing means being movable between a plurality of different positions in each of which said second section receives a different amount of radiation and said directing means comprising a filter having portions of different radiation transmissivity; and means for moving said directing means between said positions.

2. The apparatus of claim 1, wherein said moving means comprises a treadle.

3. The apparatus of claim 1, wherein said directing means is turnable between said positions thereof.

4. The apparatus of claim 1, wherein said moving means comprises means for confining said directing means to translatory movements between said positions thereof.

5. The apparatus of claim 1, wherein the entire radiation issuing from said first section impinges upon said directing means in each position of said directing means.

6. The apparatus of claim 1, further comprising a common enclosure for the second ends of said sections, said moving means being carried by said enclosure.

7. The apparatus of claim 1, wherein the at least one component includes a variable-speed motor and said detector includes means for operating the motor at a plurality of different speeds in response to reception of different amounts of radiation from said second section.

8. The apparatus of claim 1, wherein the at least one component includes a device which is operable to maintain a mobile needle of the sewing machine in a selected position and said detector includes means for operating said device in response to reception of a predetermined amount of radiation from said second section.

9. The apparatus of claim 1, wherein said filter includes a glass plate.

10. The apparatus of claim 1, wherein said filter includes at least one first portion which transmits a maximum amount of radiation and a series of second portions which transmit radiation at a linearly or progressively decreasing rate.

11. The apparatus of claim 10, wherein said filter further includes at least one additional portion which transmits a minimal amount of radiation including zero.

12. The apparatus of claim 11, wherein said at least one additional portion is adjacent said at least one first portion.

13. The apparatus of claim 10, wherein said filter further comprises a plurality of alternating portions of maximum and minimum transmissivity.

14. The apparatus of claim 1, wherein said means for supplying radiation includes a source of polarized light.

15. The apparatus of claim 1, wherein said means for supplying radiation includes a source of frequency modulated radiation.

16. The apparatus of claim 1, wherein said detector includes means for converting optical signals into electrical signals.

17. The apparatus of claim 1, wherein said detector and said radiation supplying means are installed in the sewing machine and the at least one component includes a variable-speed electric motor.

18. Apparatus for controlling the operation of a device which is operable to maintain a mobile needle of a sewing machine in a selected position, comprising at least one optical detector; at least one radiation guide comprising a first section having a radiation receiving first end and a second end and a second section having a radiation transmitting first end connected with said detector and a second end, said second ends being disposed outside of the sewing machine; means for supplying radiation to the first end of said first section so that the thus supplied radiation issues from the second end of said first section; means for directing radiation which issues from the second end of said first section into the second end of said second section wherein the radiation is propagated to said detector, said detector including means for operating said device in response to reception of a predetermined amount of radiation from said second section and said directing means being movable between a plurality of different positions in each of which said second section receives a different amount of radiation; and means for moving said directing means between said positions.

19. Apparatus for controlling the operation of at least one component of a sewing machine, comprising at least one optical detector; at least one radiation guide comprising a first section having a radiation receiving first end and a second end and a second section having a radiation transmitting first end connected with said detector and a second end, said second ends being disposed outside of the sewing machine; means for supplying radiation to the first end of said first section so that the thus supplied radiation issues from the second end of said first section; means for directing radiation which issues from the second end of said first section into the second end of said second section wherein the radiation is propagated to said detector, said directing means including portions of different reflectivity for radiation which issues from said first section and said directing means being movable between a plurality of different positions in each of which said second section receives a different amount of radiation; and means for moving said directing means between said positions.

20. Apparatus for controlling the operation of at least one component of a sewing machine, comprising at least one optical detector; at least one radiation guide comprising a first section having a radiation receiving first end and a second end and a second section having a radiation transmitting first end connected with said detector and a second end, said second ends being disposed outside of the sewing machine; means for supplying radiation to the first end of said first section so that the thus supplied radiation issues from the second end of said first section; means for directing radiation which issues from the second end of said first section into the second end of said second section wherein the radiation is propagated to said detector, said directing means including a spectral filter and said directing means being movable between a plurality of different positions in each of which said second section receives a different amount of radiation; and means for moving said directing means between said positions.

* * * * *